March 29, 1966  H. A. ENGE  3,243,667

NON DISPERSIVE MAGNETIC DEFLECTION APPARATUS AND METHOD

Filed April 9, 1962  6 Sheets-Sheet 1

March 29, 1966 H. A. ENGE 3,243,667
NON DISPERSIVE MAGNETIC DEFLECTION APPARATUS AND METHOD
Filed April 9, 1962 6 Sheets-Sheet 2

March 29, 1966     H. A. ENGE     3,243,667
NON DISPERSIVE MAGNETIC DEFLECTION APPARATUS AND METHOD
Filed April 9, 1962     6 Sheets-Sheet 6

United States Patent Office 3,243,667
Patented Mar. 29, 1966

3,243,667
NON DISPERSIVE MAGNETIC DEFLECTION APPARATUS AND METHOD
Harald A. Enge, Winchester, Mass., assignor to High Voltage Engineering Corporation, Burlington, Mass., a corporation of Massachusetts
Filed Apr. 9, 1962, Ser. No. 186,254
5 Claims. (Cl. 317—200)

This invention relates to the deflection of beams of charged particles and in particular to a novel method for effecting such deflection without substantial dispersion of the beam and to novel magnetic apparatus for carrying out the method. Briefly summarized, the method of the invention comprehends producing a magnetic field having a Cartesian component the intensity of which increases with increasing distance from a predetermined plane parallel to said component, and directing the beam of charged particles to be deflected into said magnetic field through said plane and perpendicular to said component and at an angle to said plane which angle is equal to one-half the desired angle of deflection; and the magnetic apparatus of the invention comprehends a beam-bending magnet having convex pole faces which are symmetric about the median plane between them, together with a plate of magnetic material transverse to said median plane, the mutual separation of said pole faces decreasing with increasing distance from said plate. The plate has an aperture on the median plane, and in operation a charged particle beam is injected therethrough along the median plane at an angle to said plate which is half the desired angle of deflection. For any desired angle of deflection, the separation of the pole faces and the shape thereof can be adjusted, in accordance with the invention, so that the beam is looped back so as to cross its original course at the point of entry into the magnetic field and at the desired angle of deflection.

In connection with particle accelerators for the acceleration of charged particles to high velocity, it is frequently desirable to have additional apparatus for changing the direction of the charged particle beam which has been accelerated by the particle accelerator. For example, a need to bend the charged particle beam may be caused by geometrical limitations of the room in which the particle accelerator is located, or it may be desired to direct the charged particle beam alternatively into one of several beam utilization areas. In electron irradiation installations, wherein products are irradiated on a conveyor by an electron beam from an electron accelerator, space limitations frequently require that the accelerator be mounted horizontally, but the need for a horizontal product conveyor may make it desirable to have the emergent beam travelling in the vertical direction as it strikes the product. Again, it will occasionally be desirable in radiographic installations to cause the electron beam to be deflected before striking the target for the production of X-rays. In the case of large accelerators for the acceleration of charged particles to high energy for studies in nuclear physics and the like, the cost of operating the accelerator and the original capital cost of the accelerator are so large that such an accelerator will be used for a variety of purposes, so that generally there will be several beam utilization areas associated with such an accelerator, and some sort of beam bending device is required (such as a switching magnet) in order to direct the beam into one of the beam utilization areas.

It will be apparent from the foregoing that the invention is not limited to any particular deflection angle. However, for the purposes indicated, a very common angle of deflection is 90° and so the invention will be described with particular reference to deflection angles in the vicinity of 90°, but it will be apparent from the following that the invention is not limited to this range of deflection angles.

Another very important application of the invention is in the investigation of 180° electron scattering, wherein the target to be investigated is bombarded by an electron beam and it is desired to measure the electrons scattered directly backward from the target. The invention renders it unnecessary to locate the detection apparatus in the path of the incident electron beam.

For these and other reasons, then, there has been a long felt need in the field for adequate beam bending means. To date, however, the prior art has provided only charged particle beam deflectors that, in some respects, are something less than satisfactory. More specifically, while it is well known in the art that a charged particle beam can be deflected by a magnetic field, the beam-bending devices of the prior art have been dispersive so that an energy spread of ten percent, for instance, results in a large spatial separation at the exit of the magnet. That is to say, the fact that the constituent particles of any given charged particle beam do not have exactly the same energy causes them to be deflected differently by the same magnetic field, resulting in some degree of beam dispersion.

The beam bending device of the invention provides a completely non-dispersive system. This means that all charged particles having the selected incident trajectory will follow the same shape orbit curve, the size of which will be greater the higher the momentum of the particle, and will emerge from the beam bending device on the same exit trajectory. This is true for all energies, so long as the magnet is large enough to accommodate the loop trajectory. Devices of the prior art have generally been non-dispersive over only a limited energy range. Consequently, the magnet used in the beam-bending device of the invention may be a permanent magnet or an electromagnet utilizing an unstabilized power supply. Moreover, the beam bending device of the invention does not have median-plane focusing; that is, a parallel beam entering the device in the median plane will emerge as a parallel beam. In the direction perpendicular to the median plane there will be a weak positive focusing action for the 90° magnet and a weak defocusing action for the 98.6° magnet; for the 96.2° magnet and in certain other cases there will be no focusing in either plane: that is, a parallel beam entering the device will emerge as a parallel beam.

The invention may best be understood from the following detailed description thereof having reference to the accompanying drawings in which.

Figure 1:
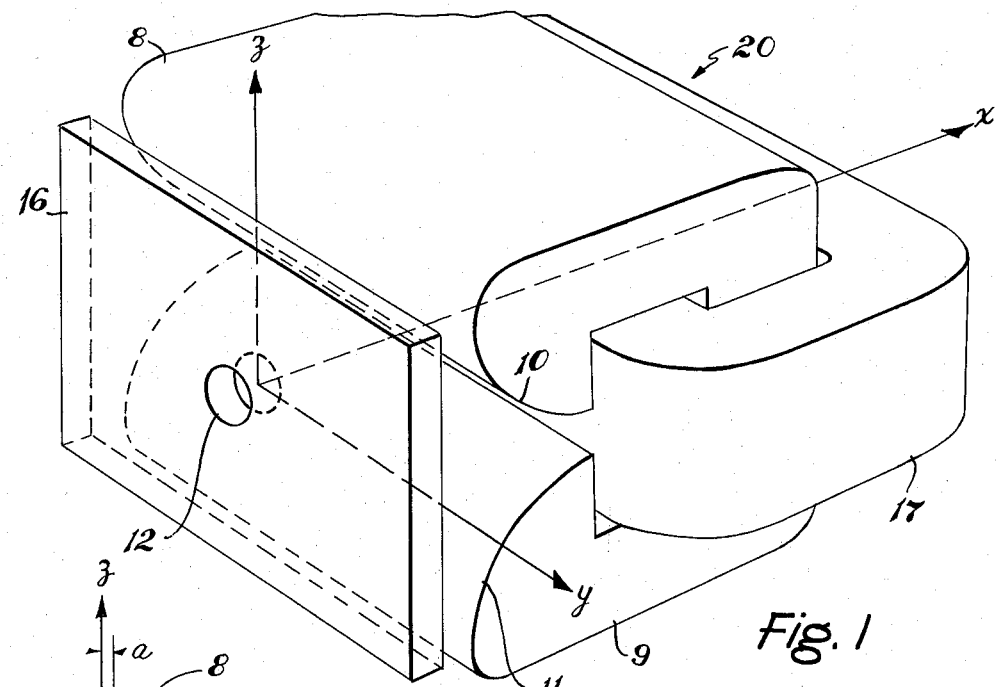
FIGURE 1 is an isometric view of one presently preferred embodiment of my invention.
Figure 2:
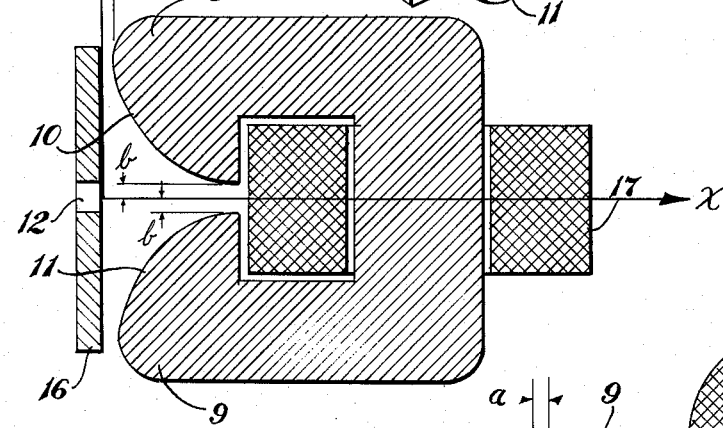
FIGURE 2 is a sectional view of said embodiment taken in the $xz$ plane thereof.
Figure 3:
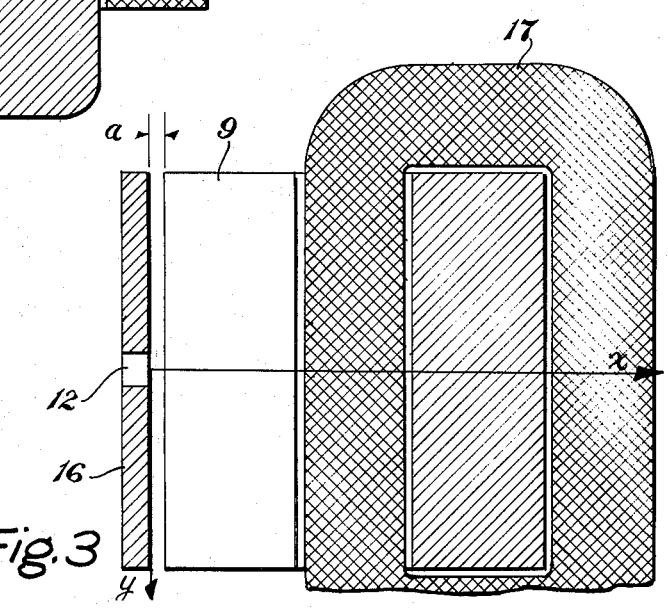
FIGURE 3 is a sectional view of said embodiment taken in the $xy$ plane thereof.

Referring now to FIGURES 1, 2 and 3, there is illustrated apparatus as comprehended by my invention. The isometric view of FIGURE 1 presents one illustrative embodiment of my invention in relation to Cartesian coordinates $x$, $y$ and $z$. The apparatus is symmetric about the $xy$ plane, which is the median plane of the apparatus. Charged particle beam deflector 20 as illustrated in FIGURE 1 comprises pole members 8, 9, coil 17, and plate member 16. Plate member 16 is spaced apart a distance $a$ from the edges of pole members 8, 9, with the plane forming that surface of said plate 16 which faces said pole members 8, 9 lying in the $yz$ plane. An aperture 12 is disposed in plate member 16 on the median plane to allow the passage therethrough of the charged particle beam. Pole members 8, 9 have convex adjacent surfaces 10, 11 respectively and are equally spaced at a distance $b$ from the median plane. The specific geometry, such as curvature of surfaces 10, 11 and distances $a$ and $b$ in part determine the nature of the magnetic field, and hence the angle of beam deflection, and will be described in greater detail with reference to FIGURES 6 and 7.

Figure 4:
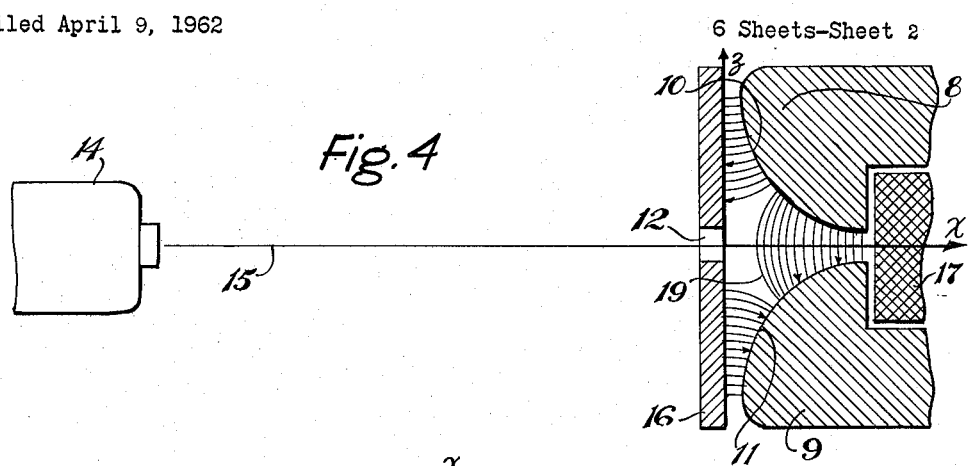
FIGURE 4 is a partial sectional view in the $xz$ plane of said embodiment illustrating the relationship of the charged particle beam to the magnetic field.
Figure 5:
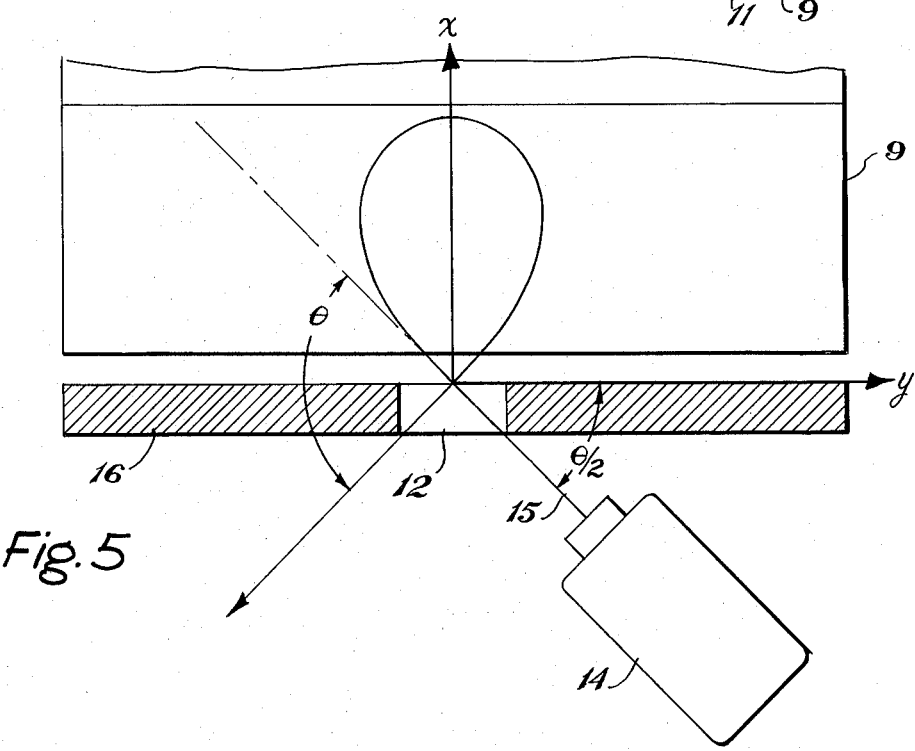
FIGURE 5 is a partial sectional view in the $xy$ plane of said embodiment illustrating the behavior of a charged particle beam passing therethrough.
Figure 9:
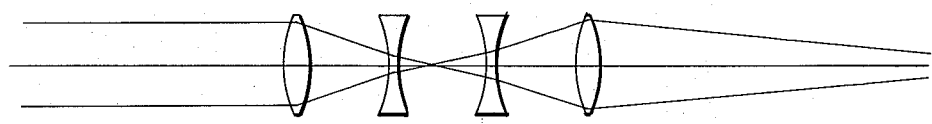
FIGURE 9 is a diagram indicating the optical equivalent of the vertical focusing connected with the graph of FIGURE 8.

FIGURES 4 and 5 illustrate the relationship of the charged particle beam to the apparatus of FIGURE 1 and show the behavior of such a beam under the influence of the magnetic field 19 created thereby. As is seen in FIGURE 4, the beam 15 generated by particle accelerator 14 is projected through aperture 12 of plate member 16, and remains substantially on the median plane. FIGURE 5 illustrates the loop in the median plane through which beam 15 is deflected as it traverses the magnetic field. As described above, if it is desired to deflect beam 15 through an angle $\theta$, said beam 15 is directed into the magnetic field of beam deflector 20 at an angle $\theta/2$ with respect to the $yz$ plane. The magnetic field is adapted to deflect the beam through an angle $-(360°-\theta)$ and eject said beam at an angle $\theta$ with respect to the original beam course.

A single charged particle beam deflector as described above may be designed to deflect a beam through any angle less than 180°. However, two angles are of particular interest. For an angle of deflection $\theta$ equal to 98.6° the magnetic field configuration may be quite similar to that of the well-known quadrupole lens. Thus, referring particularly to FIG. 4, the pole faces of the electromagnet may be of hyperbolic cross section with the flat member of magnetic material positioned so that the surface thereof facing the pole faces lies along an asymptote, while the median plane lies along the other asymptote. In such a device, the magnetic flux lines all lie in planes parallel to the drawing of FIG. 4 and are ideally hyperbolic in form, so that the vertical component $B_z$ of the magnetic flux is proportional to the distance $x$ from the flat magnetic member. As is the case with quadrupole lenses currently manufactured, the hyperbolic part of the pole cross section can be made circular without serious impairment of the performance.

For a desired deflection angle differing from 98.6° the pole faces must be reshaped so that the vertical magnetic flux $B_z$ is equal to $Kx^n$ where $n$ is now a number different from 1. If a deflection angle of 90° is desired, the pole faces must be so shaped and spaced that $n$ is equal approximately to 0.8. For any deflection angle, the exponent $n$ may readily be computed using modern computer methods, and the resultant cross sectional boundary of the pole faces, such as that shown in FIG. 4, may then be used to form a die for cutting out a multiplicity of pieces in that shape from sheet metal which may then be cemented together to form a laminated magnet. Again, in many cases adequate accuracy may be obtained by using pole pieces of circular cross section, but mounted farther apart than in the case described above.

The orientation of the magnetic field is such as to produce deflection in the direction opposite to that of the ultimately desired deflection, so that the trajectories are loops as shown in FIG. 5. When the exponent $n$ is properly selected for the corresponding angle of deflection, the size of the loop will be a function of the energy of the incoming particles but for all charged particles entering the magnetic field along the selected trajectory the angle of deflection will be the same, and all will emerge from the magnetic field at the same point. A beam consisting of mono-energetic particles moving in the $xy$ plane along parallel trajectories at the entrance will be focused to a point on the $x$-axis within the magnetic field. Particles of different energies (or momenta) will be focused to different points, and the distance along the $x$ axis to the focal point (the apex of the loop) is proportional to the $(n+1)$th root of the momentum of the particle. The beam emerging from the magnet will again be parallel in the $xy$ plane. There is thus no focusing in the median plane; i.e. the magnet has no net effect on the beam in the $xy$ plane except for the deflection, in the median plane, through the desired angle.

Figure 6:
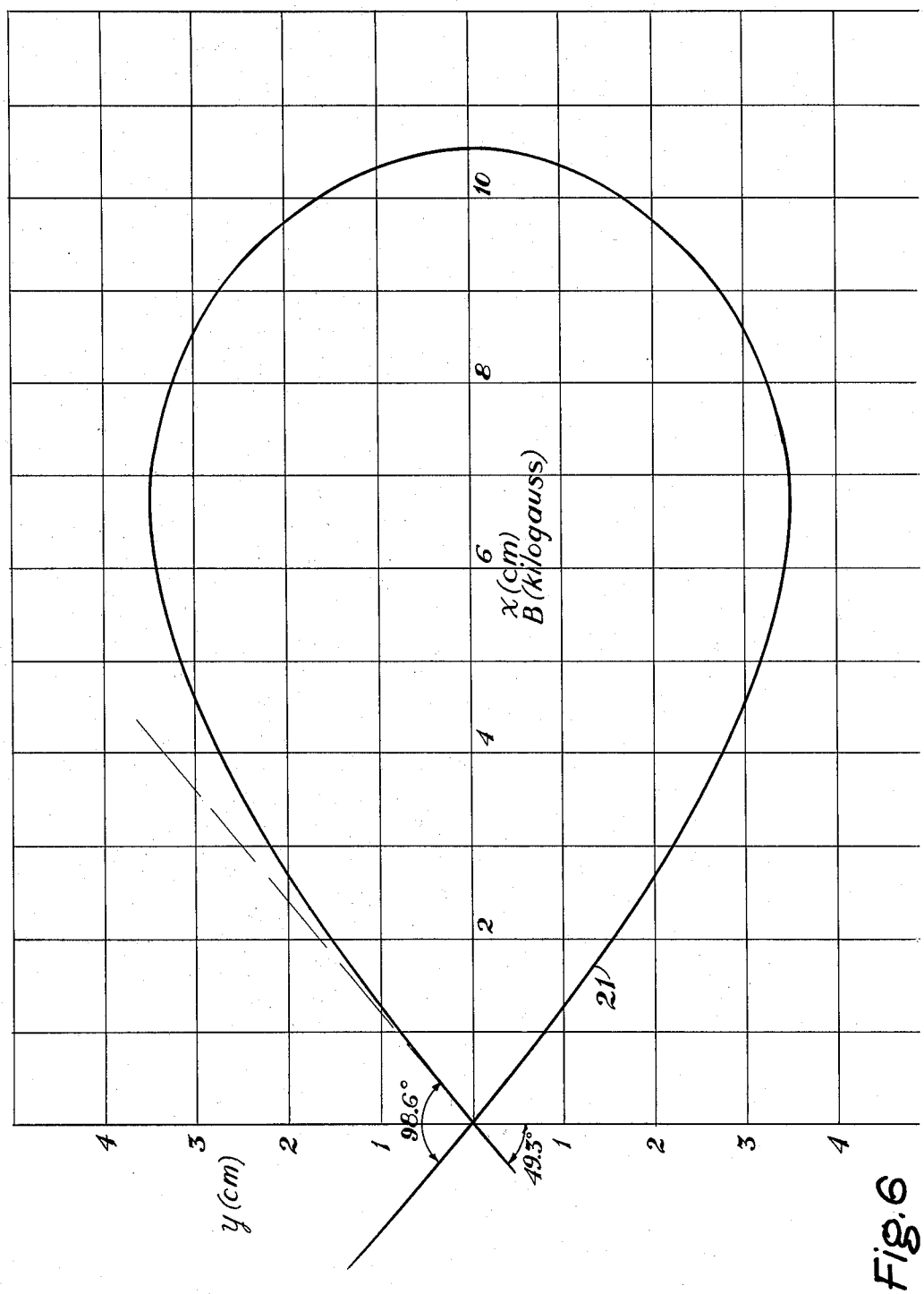
FIGURE 6 is a graph illustrating the trajectory of a charged particle beam in a 98.6° beam deflector as comprehended by my invention.

The particle trajectory as plotted in FIGURE 6 is of particular interest because the beam deflector used to create it is fabricated from conventional quadrupole components. That is, the pole faces 10, 11 are ideally hyperbolic in form and are spaced apart a distance adapted to create a conventional quadrupole field. The significant difference is, of course, that the two opposite poles of the quadrupole arrangement have been replaced by plate 16, thereby creating a planar boundary for the injection of the charged particle beam therein.

With reference now to FIGURE 6, the magnetic field is represented by the conventional quadrupole equations.

$$B_z = -Fx, \quad B_x = -Fz, \quad B_y = 0 \qquad (1)$$

For such a magnetic field a charged particle beam having an initial direction of 49.3° with reference to the $yz$ plane will have a trajectory, as shown at 21, such that all particles in the beam, regardless of energy, are looped back so as to cross the original trajectory and leave the magnetic field at the point at which it entered the magnetic field with a total angle of deflection of 98.6°.

The motion in the direction perpendicular to the plane of the drawing has also been studied, and an incident particle moving parallel to the median plane with $z=5$ millimeters will experience positive focusing first and will cross through the median plane close to the position where $x=$maximum. It will leave the magnet at $z=-5$ mm. and parallel to the median plane if the incident angle is slightly less than 48 degrees. For $\theta = 49.3°$, the focusing in the $z$ direction is slightly too weak to produce a parallel beam at the exit for a parallel beam entering. Therefore, the beam in the $z$ direction will be slightly diverging at the exit. In the horizontal plane, as hereinbefore stated, a parallel beam in will produce a parallel beam out. This can be seen very simply by displacing the curve up or down on the graph in the $y$ direction.

Figure 7:
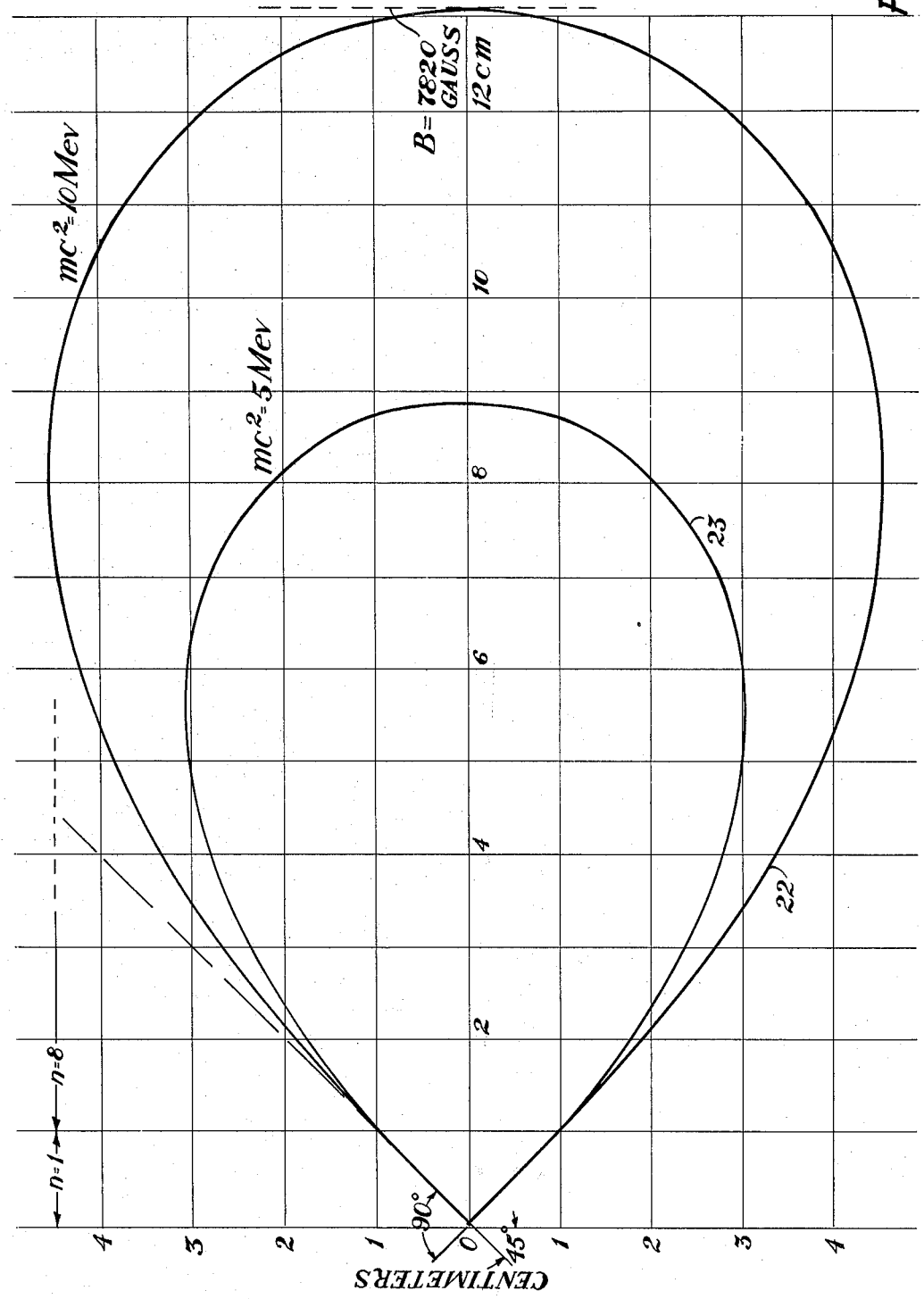
FIGURE 7 is a graph illustrating the respective trajectories of two charged particle beams in a 90° beam deflector as comprehended by my invention.

Of perhaps greater interest is the 90° beam deflector which creates a beam trajectory as illustrated in FIGURE 7. The 90° beam deflector has the greatest practical utility of all such beam deflectors. In order to obtain a beam exit at the point of entrance for a 45° incident direction it is necessary to make the field increase more slowly than the quadrupole field does as a function of $x$. That is, there is established a field that varies as $x_n$ where $n$ is smaller than 1. The field equations in the present example in the median plane are $$B_{z,0} = -Fx_1\left(\frac{x}{x_1}\right)^n \qquad B_{x,0} = 0 \qquad B_y = 0 \qquad (2)$$

Off the median plane, the field components have been determined by the use of Taylor expansion and the general field equations, and are as follows:

$$B_z = -Fx_1\left(\frac{x}{x_1}\right)^n + F\frac{n(n-1)}{2x_1}\left(\frac{x}{x_1}\right)^{n-2} z^2 \quad (3)$$

$$B_y = 0 \quad (4)$$

$$B_x = -Fn\left(\frac{x}{x_1}\right)^{n-1} z \quad (5)$$

For any desired deflection angle, the geometry of the deflector components may be determined analytically through the use of the field equations by ascertaining the proper value of $n$. An operable device may be developed empirically by using pole members having semicylindrical or hyperbolic faces and separating them slightly more than would be the case for a quadrupole field.

With reference to trajectory 22 of the beam as plotted in FIGURE 7, involving a total deflection of 90°, $n$ should be .8. Other parameters shown in the example of FIG. 7 are: $F=10$ Weber/$m^3$, $q/m=.898\times10^{10}$ Weber$^{-1}$—$m^2$—sec$^{-1}$. The specific charge $q/m$ given is that for an electron of total energy 10 m.e.v. The trajectory for an electron of the total energy 5 m.e.v. is shown at 23 in FIGURE 7.

Since for $z\neq0$ and $x=0$ the Expressions (3) and (5) give infinite field components, these equations do not exactly represent a practical magnet, and are also inconvenient, computation-wise, near $x=0$. In the computations, therefore, a quadrupole field (i.e. $n=1$) has been employed in the region $0<x<1$ cm. This has a negligible effect on the orbit in the median plane, but has some influence on the focusing properties in the direction perpendicular to the median plane ($z$-direction). The constants are chosen so that the $z$ component of the field matches at the boundary. The $x$ component of the field and the $z$ component off the median plane will not match exactly at the boundary; but at least as far as the $xy$ motion is concerned, this will be of minor importance. It is important to note that all distances in the $xy$ plane vary as the 1.8th root of the momentum. Therefore, if the field is not exactly right so that the orbit does not exit exactly at the origin, the dispersion is so extremely small that the various energy component of the beam will stay close together anyway.

Figure 8:
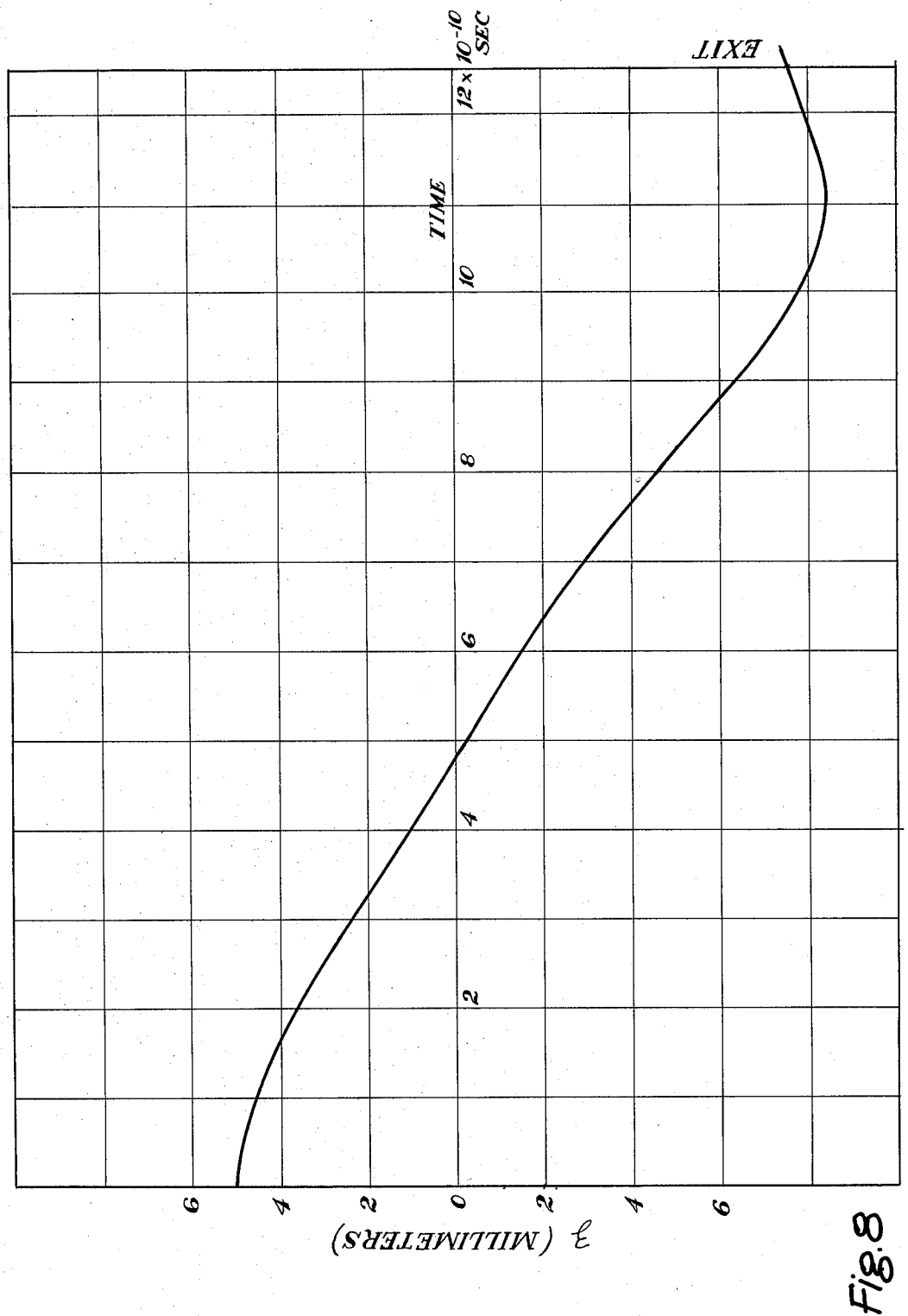
FIGURE 8 is a graph illustrating the motion perpendicular to the median plane of one of the particles whose trajectory is shown in the graph of FIGURE 7.

In FIGURE 8 is shown the motion of a particle in the $z$ direction for the 90° case shown in FIGURE 7. The particle enters parallel to the median plane at $z=5$ mm. Some over-focusing takes place so that the particles converge after exit. The $z$-direction crossover will be at approximately 35 cms. after the exit for this particular case.

As hereinbefore stated, this magnet may be built with hyperbolic pole pieces or circular pole pieces, and the pole pieces should be separated slightly more than for producing a quadrupole field. They will then produce a field that dies out more slowly than the quadrupole field. The maximum field strength in the gap could be in the 12 to 14 kilogauss range. This will bring $x_{max}$ down to the order of 8 cms. for 10 m.e.v. electrons. With such small dimensions, even if the field distribution is far from correct, the resulting dispersion at the exit will be slight. The power supply for the magnet, as noted hereinbefore, does not need to be stabilized. If one needs to bring the electrons to a point focus, one can obtain some focusing in the horizontal plane at the expense of some of the focusing in the $z$ direction. Mathematically, this can be done by adding a small correction term proportional to $y^2$ in the expression for $B_z$. In practice, this would have to be done by giving the pole surfaces a double curvature. This is awkward of course with solid iron, but not so hard with laminations.

In a deflecting magnet of the general type described, two of three parameters may be selected by an appropriate selection of $n$, but the third is then fixed. In all the embodiments described so far, the dispersion parameter has been chosen to provide non-dispersion. The two other parameters are the deflection agle and focusing in the plane perpendicular to the median plane (hereinafter called "vertical focusing" for convenience, although the median plane need not be horizontal). In the embodiment of FIGURE 6, neither of these parameters was deliberately chosen: instead, $n$ was set equal to 1, and a deflection angle of 98.6° with slight vertical defocusing resulted. In the embodiment of FIGURE 7, the deflection angle was set at 90°; this required that $n$ be 0.8 and resulted in slight vertical focusing. Vertical focusing may be eliminated altogether by setting $n$ equal to .945 and using a deflection angle of 96.2°. Vertical focusing may also be eliminated by sacrificing the quality of nondispersion. However, nondispersion may be regained by using two symmetrically disposed magnets of the type described, as shown in FIGURE 10.

Figure 10:
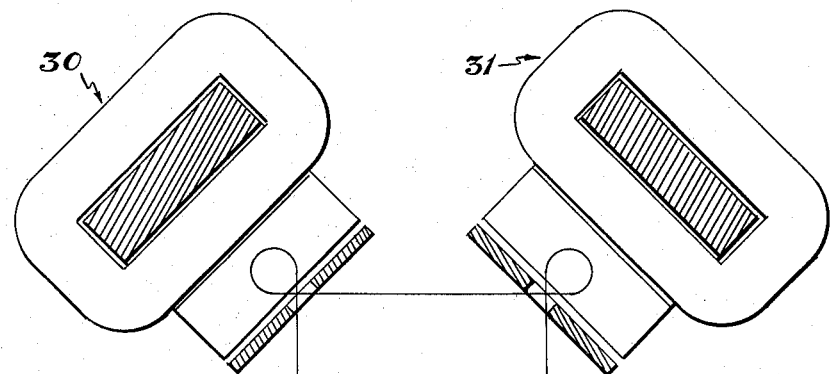
FIGURE 10 is a somewhat diagrammatic view showing a pair of magnets symmetrically arranged to provide 180° deflection.

Referring to FIGURE 10, the two magnets therein shown at 30, 31, respectively, are 90° bending magnets of the type hereinbefore described, except that $n=1.44$ approximately. The dispersion introduced in the first 90° magnet is eliminated by the second, so that a total deflection of 180° is achieved which is non-dispersive and in which a parallel beam entering emerges as a parallel beam.

Figure 11:
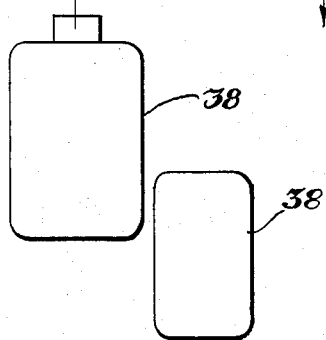
FIGURE 11 is a somewhat diagrammatic view showing the use of three magnets to enable a single particle accelerator to serve five target areas.
Figure 11:
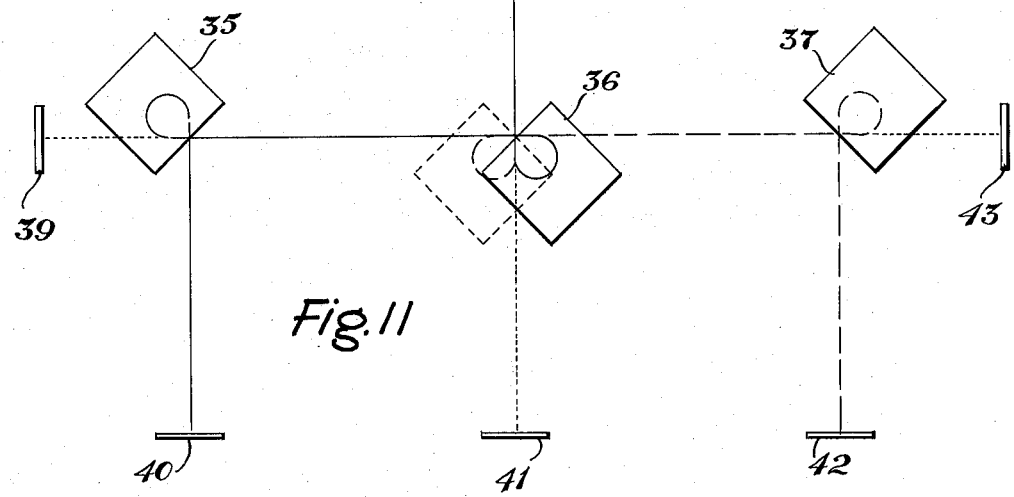

These two features are very useful in microwave linear accelerators, which generally provide a parallel beam of electrons. Moreover, owing to the small magnet size involved, the short focal lengths mean that any focusing action will cause beam diameter to increase substantially. Thus, where these two features are present, as in the case of a deflection angle of 96.2° or in the case of double, symmetric magnets, several bending magnets may be used in sequence without hazard of beam alteration. For example, as shown in FIGURE 11, three bending magnets 35, 36, 37, each having a deflection angle of 96.2° may be used to enable a single particle accelerator 38 to serve five target areas 39, 40, 41, 42 and 43. The central magnet 36 is reversible by mechanical rotation.

Having thus described the principles of the invention, together with several illustrative embodiments thereof, it is to be understood that, although specific terms are employed, they are used in a generic and descriptive sense, and not for purposes of limitation, the scope of the invention being set forth in the following claims.

I claim:
1. The method of deflecting a beam of charged particles of diverse energies through a desired angle which method comprises the following steps: (1) producing a magnetic field having a Cartesian component the intensity of which increases proportionately with approximately the .945th power of distance from a predetermined plane parallel to said component; (2) directing the beam of charged particles to be deflected into said magnetic field through said plane and perpendicular to said component and at an angle of approximately 48.1° to said plane and, in producing said magnetic field, causing the intensity of said component to have a value such that said beam of charged particles emerges from said magnetic field through said plane substantially at the point of entry.

2. The method of deflecting a beam of charged particles of diverse energies through a desired angle which method comprises the following steps: (1) producing a first magnetic field having a first Cartesian component the intensity of which increases proportionately with the $n$th power of distance from a first predetermined plane parallel to said component; (2) directing the beam of charged particles to be deflected into said first magnetic field through said first plane and perpendicular to said first component and at an angle to said plane which angle is equal to one quarter the desired angle of deflection, and, in producing said first magnetic field, causing the intensity of said first component and said number $n$ each to have respective values such that said beam of charged particles emerges from said first magnetic field through said first plane substantially at the point of entry, (3) producing a second magnetic field, having a second Cartesian component the intensity of which increases proportionately with the $n$th power of distance from a second predetermined plane parallel to said component; (4) directing the beam of charged particles to be deflected, after it has issued from said first magnetic field into said second magnetic field through said second plane and perpendicular to said second component and at an angle to said plane which angle is equal to one quarter the desired angle of deflection, whereby said beam of charged particles emerges from said second magnetic field through said second plane substantially at the point of entry.

3. A method in accordance with claim 2, wherein $n$ is equal to 1.44 and the desired angle of deflection is 180°.

4. Apparatus for deflecting a beam of charged particles through a predetermined angle comprising a pair of magnets each having a pair of convex pole faces symmetrically disposed about the median plane between them, said magnets having a common median plane and being disposed symmetrically about a vertical plane perpendicular to said median plane; a pair of plates of magnetic material corresponding respectively to said pair of magnets and disposed transverse to said median plane and symmetrically about said vertical plane and each at an angle thereto which angle is equal to one-quarter said predetermined angle; the mutual separation of said pole faces decreasing with increasing distance from their respective plates; each plate having an aperture therethrough on said median plane symmetrically disposed with respect to said vertical plane.

5. Apparatus in accordance with claim 4, wherein said predetermined angle is equal to 180° and the mutual separation of said pole faces decreases proportionately with the 1.44th power of distance from their respective plates.

References Cited by the Examiner
UNITED STATES PATENTS

| | | | |
|---|---|---|---|
| 2,471,935 | 5/1949 | Coggeshall et al. | 250—41.9 |
| 2,615,128 | 10/1952 | Ruderfer | 313—75 X |
| 2,636,999 | 4/1953 | Hewitt | 313—75 |
| 2,651,000 | 9/1953 | Linder | 313—75 X |
| 2,752,501 | 6/1956 | Robinson | 313—63 X |
| 2,777,958 | 1/1957 | Poole | 313—77 X |
| 2,824,969 | 2/1958 | Crowley-Milling | 313—76 X |
| 2,872,574 | 2/1959 | McMillan et al. | 317—200 X |
| 2,909,688 | 10/1959 | Archard | 317—200 X |
| 2,945,125 | 7/1960 | Bruck et al. | 250—41.9 |

BERNARD A. GILHEANY, *Primary Examiner.*

A. GAUSS, *Examiner.*

C. O. GARDNER, G. HARRIS, JR.,
*Assistant Examiners.*